US009428146B2

(12) United States Patent
Osada

(10) Patent No.: US 9,428,146 B2
(45) Date of Patent: Aug. 30, 2016

(54) SEAT BELT RETRACTOR AND SEAT BELT APPARATUS EMPLOYING SEAT BELT RETRACTOR

(71) Applicant: TAKATA CORPORATION, Tokyo (JP)

(72) Inventor: Kenji Osada, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 0 days.

(21) Appl. No.: 14/431,231

(22) PCT Filed: Oct. 9, 2013

(86) PCT No.: PCT/JP2013/077429
§ 371 (c)(1),
(2) Date: Mar. 25, 2015

(87) PCT Pub. No.: WO2014/080702
PCT Pub. Date: May 30, 2014

(65) Prior Publication Data
US 2015/0217722 A1 Aug. 6, 2015

(30) Foreign Application Priority Data
Nov. 20, 2012 (JP) .................................. 2012-254088

(51) Int. Cl.
*B60R 22/40* (2006.01)
*B60R 22/35* (2006.01)
(Continued)

(52) U.S. Cl.
CPC ............... *B60R 22/40* (2013.01); *B60R 22/35* (2013.01); *B60R 22/36* (2013.01); *B60R 22/405* (2013.01); *B60R 22/41* (2013.01); *B60R 22/415* (2013.01); *B60R 2022/3419* (2013.01)

(58) Field of Classification Search
CPC ..... B60R 22/40; B60R 22/41; B60R 22/415; B60R 22/36; B60R 22/35
See application file for complete search history.

(56) References Cited

U.S. PATENT DOCUMENTS

| 4,749,142 A | 6/1988 | Saitow |
| 5,826,813 A | 10/1998 | Hibata |

(Continued)

FOREIGN PATENT DOCUMENTS

| CN | 101380993 A | 3/2009 |
| CN | 101472773 A | 7/2009 |

(Continued)

OTHER PUBLICATIONS

International Search Report dated Jan. 14, 2014 issued in PCT/JP2013/077429.

(Continued)

*Primary Examiner* — Faye M Fleming
(74) *Attorney, Agent, or Firm* — Foley & Lardner LLP

(57) ABSTRACT

[Object]
To cancel both a function of a vehicle sensor and a function of a webbing sensor at a predetermined condition while having a simple structure and a fewer number of parts.
[Solution]
When fully retracting a seat belt 4, a cam follower 22b abuts against a first cam portion 20a; accordingly, an actuator holding portion 23b urges an actuator 13b in a non-operable position and a function of a vehicle sensor 13 is canceled. When a large load is applied to the actuator holding portion 23b while in the above canceled state, the load is supported by the first cam portion 20a; accordingly, first and second levers 22 and 23 do not pivot and cancellation of the function of the vehicle sensor 13 is prevented from being canceled. Furthermore, when a lock claw 22c is separated from a ratchet tooth 17b, a ring gear 17 becomes rotatable and a function of a webbing sensor 12 is canceled.

5 Claims, 9 Drawing Sheets

(51) Int. Cl.
*B60R 22/36* (2006.01)
*B60R 22/415* (2006.01)
*B60R 22/41* (2006.01)
*B60R 22/405* (2006.01)
*B60R 22/34* (2006.01)

(56) References Cited

U.S. PATENT DOCUMENTS

| | | | |
|---|---|---|---|
| 7,090,304 B2 | 8/2006 | Delventhal et al. | |
| 7,637,536 B2 * | 12/2009 | Delventhal | B65H 75/48 242/383.2 |
| 2009/0057470 A1 | 3/2009 | Hiramatsu et al. | |
| 2009/0057471 A1 * | 3/2009 | Hiramatsu | B60R 22/405 242/396.1 |
| 2010/0123348 A1 * | 5/2010 | Hiramatsu | B60R 22/4676 297/476 |
| 2011/0073699 A1 | 3/2011 | Kroger et al. | |
| 2011/0089282 A1 | 4/2011 | Guillem | |
| 2011/0163194 A1 | 7/2011 | Aranda et al. | |
| 2012/0303219 A1 * | 11/2012 | Osada | B60R 22/405 701/45 |

FOREIGN PATENT DOCUMENTS

| | | |
|---|---|---|
| EP | 1 394 004 A1 | 3/2004 |
| JP | 09-309408 A | 12/1997 |
| JP | 2004-090672 A | 3/2004 |
| JP | 2006-224954 A | 8/2006 |
| JP | 03-947064 B2 | 7/2007 |
| JP | 2008-049939 A | 3/2008 |
| JP | 2009-061810 A | 3/2009 |
| JP | 2009-132317 A | 6/2009 |
| JP | 2010-179863 A | 8/2010 |
| JP | 2011-520705 | 7/2011 |
| JP | 2012-192854 A | 10/2012 |
| WO | WO-2008/064870 A1 | 6/2008 |
| WO | WO-2009/143984 A1 | 12/2009 |
| WO | WO-2010/046053 A1 | 4/2010 |
| WO | WO-2010/051949 A1 | 5/2010 |
| WO | WO-2012/039088 A1 | 3/2012 |
| WO | WO-2013/133071 A1 | 9/2013 |

OTHER PUBLICATIONS

Extended European Search Report issued in Application No. 13857483.5 dated Mar. 30, 2016.
Notice of Rejection issued in Japanese Patent Application No. 2012-254088 dated Apr. 13, 2016.

* cited by examiner

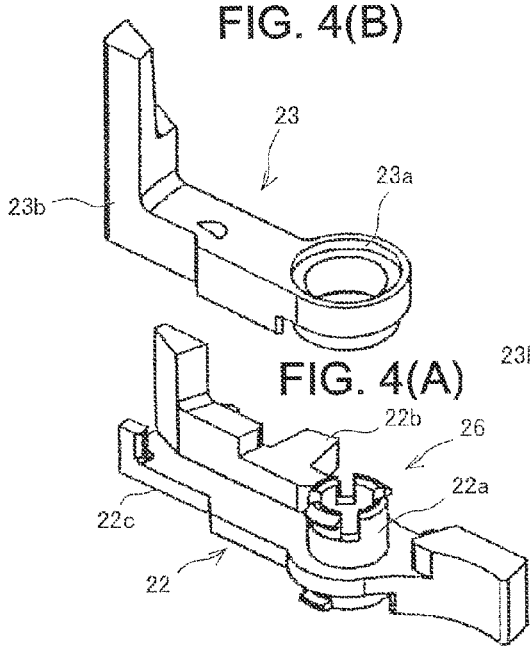
FIG. 4(B)
FIG. 4(A)
FIG. 4(C)
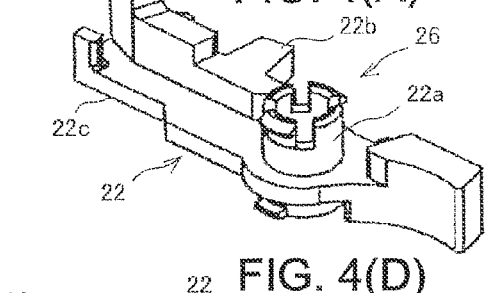
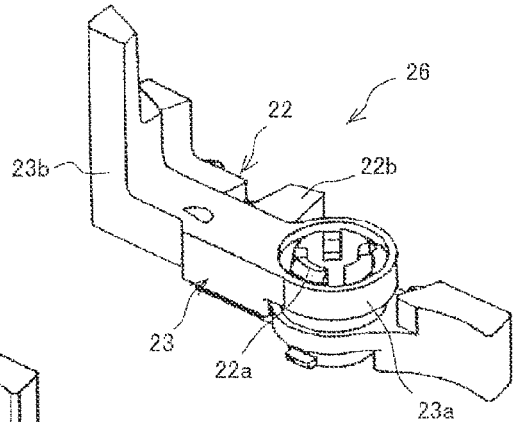
FIG. 4(D)
FIG. 4(F)
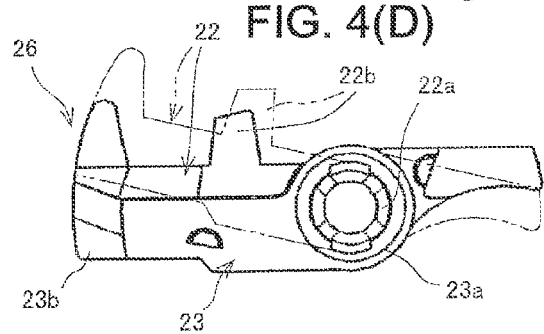
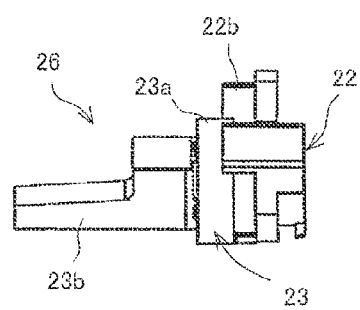
FIG. 4(E)
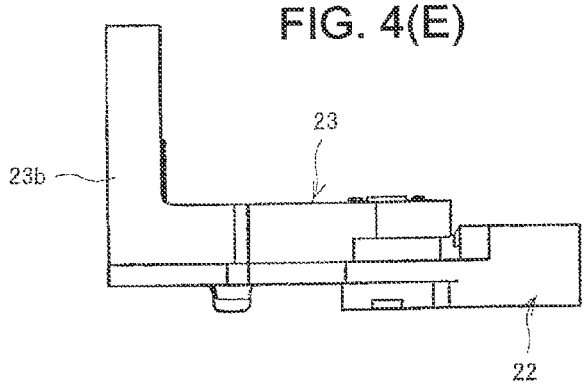

SEAT BELT RETRACTOR AND SEAT BELT APPARATUS EMPLOYING SEAT BELT RETRACTOR

TECHNICAL FIELD

The present invention relates to a technical field of a seat belt retractor that is equipped in a vehicle, such as an automobile, and that retracts webbing serving as a seat belt with a spool and relates to a seat belt apparatus that restricts an occupant with the seat belt that has been withdrawn from the seat belt retractor.

BACKGROUND ART

Hitherto, a seat belt apparatus installed on a seat of a vehicle, such as an automobile, restricts the occupant with a seat belt constituted by webbing in times of emergency (hereinafter, merely referred to as in an emergency), such as vehicular collision in which deceleration that is substantially larger than deceleration occurring during normal traveling acts on the vehicle. Generally, such a seat belt apparatus is provided with a seat belt retractor. Many of the conventional seat belt retractors include a vehicle sensor that stops withdrawal of the seat belt by being operated upon a large deceleration in an emergency, and a webbing sensor that stops withdrawal of the seat belt by being operated when the seat belt is rapidly drawn out at a rate that is higher than the normal seat belt withdrawal rate in order to fasten the seat belt, for example (in other words, with an acceleration of withdrawal that is larger than a normal acceleration of withdrawal when fastening the seat belt).

Incidentally, for example, there are cases in which the vehicle sensor is operated by vibration or the like while the vehicle is travelling even in a seat belt apparatus or the like that is installed on a vehicle seat on which no occupant is sitting and in which the seat belt is not fastened thereto. However, there are cases in which cancellation (incapacitation) of the intrinsic function of the vehicle sensor, which is the vehicle sensor not operating except for when the seat belt is fastened around the occupant and stopping the withdrawal of the seat belt by being operated in an emergency, is desired. Accordingly, a seat belt retractor that exerts the intrinsic function of the vehicle sensor described above when in a state in which the seat belt is fastened around the occupant and, further, that cancels (incapacitates) the intrinsic function of the vehicle sensor at a predetermined condition, other than when the seat belt is fastened around the occupant, that has been set in advance has been proposed (see PTL 1, for example).

The seat belt retractor described in PTL 1 includes a ring gear that integrally rotates with a spool, and a control lever. In a state in which the seat belt is withdrawn by a predetermined amount from the seat belt retractor, the ring gear does not allow the control lever to operate; accordingly, the control lever permits the vehicle sensor to operate and enables the intrinsic function of the vehicle sensor to be exerted. Furthermore, the ring gear that rotates in accordance with the rotation of the spool in the seat belt retraction direction operates the control lever; accordingly; in a state in which the spool, at least, retracts the total amount of the seat belt, the control lever stops the operation of the vehicle sensor such that the intrinsic function of the vehicle sensor is cancelled.

Meanwhile, there are cases in which the webbing sensor is operated even in a case other than the rapid seat belt withdrawal and stops the withdrawal of the seat belt from the seat belt retractor. For example, when the total amount of the seat belt that has been withdrawn is retracted, there are cases in which a so-called end lock occurs, which makes normal withdrawal of the seat belt difficult, by unintended operation of the webbing sensor.

Accordingly, in order to prevent such an end lock caused by the belt withdrawal sensor, a seat belt retractor has been proposed (see PTL 2, for example) that cancels (incapacitates) the intrinsic function of the webbing sensor that is operated and stops the withdrawal of the seat belt when the total amount of the seat belt is retracted.

The seat belt retractor described in PTL 2 includes an inertia plate that swings upon rapid seat belt withdrawal, a webbing sensor gear that is rotatably provided and that includes internal teeth and external teeth, a webbing sensor pawl that is operated upon swinging of the inertia plate and that engages with an internal tooth of the webbing sensor gear, and a gear rotation control pawl that stops the rotation of the webbing sensor gear by engaging with an external tooth of the webbing sensor gear.

In the seat belt retractor described in PTL 2, in a state in which the seat belt is withdrawn by a predetermined amount from the seat belt retractor, the gear rotation control pawl engages with an external tooth of the webbing sensor gear and makes the webbing sensor gear non-rotatable. With the above, when the webbing sensor pawl is operated upon swinging of the inertia plate and is engaged with an internal tooth of the webbing sensor gear, the webbing sensor gear does not rotate; accordingly, the intrinsic function of the webbing sensor is exerted and the withdrawal of the seat belt is stopped. Furthermore, when in a state in which the spool has retracted substantially the total amount of the seat belt, the gear rotation control pawl is separated from the external teeth of the webbing sensor gear and allows the webbing sensor gear to rotate. With the above, even if the webbing sensor pawl is operated upon swinging of the inertia plate and is engaged with an internal tooth of the webbing sensor gear, since the webbing sensor gear rotates and the spool becomes rotatable in the seat belt withdrawal direction, the intrinsic function of the webbing sensor is cancelled. Accordingly, withdrawal of the seat belt can be performed and end lock is prevented. Note that in the seat belt retractor described in PTL 2, a vehicle sensor is provided as well.

CITATION LIST

Patent Literature

PTL 1: Description of U.S. Pat. No. 7,090,304 B2
PTL 2: Japanese Patent Application No. 3947064

SUMMARY OF INVENTION

Technical Problem

Incidentally, the seat belt retractor described in PTL 1 is not provided with a webbing sensor; accordingly, the function of the webbing sensor cannot be exerted and, further, the function of the webbing sensor cannot be cancelled at a predetermined condition. Meanwhile, although the seat belt retractor described in PTL 2 is provided with, in addition to the webbing sensor, the vehicle sensor as well, the function of the vehicle sensor cannot be cancelled at a predetermined condition. Accordingly, consideration of combining the cancellation function of the vehicle sensor described in PTL 1 and the cancellation function of the webbing sensor described in PTL 2 together, and regarding the cancellation the function of the vehicle sensor and the cancellation of the function of the webbing sensor, cancelling both the functions at a predetermined condition can be made. However, a mere combination of the cancellation function of the vehicle sensor described in PTL 1 and the cancellation function of the webbing sensor described in PTL 2 will make the structure of each of the sensors and the structure of the cancelling function of each of the sensors complicated and the number of parts will become large.

The present invention has been made in view of the above situation and an object thereof is to, with a simple structure and with a fewer number of parts, provide a seat belt retractor that is capable cancelling both a function of a vehicle sensor and a function of a webbing sensor at a predetermined condition and to provide a seat belt apparatus that employs the seat belt retractor.

Solution to Problem

In order to overcome the above-described problems, a seat belt retractor according to the present invention is a seat belt retractor including at least a spool that retracts a seat belt that restricts an occupant, the seat belt retractor including a vehicle sensor that operates in an emergency in which a deceleration that is larger than a deceleration applied to a vehicle at normal times is applied, the vehicle sensor having a function of stopping rotation of the spool in a seat belt withdrawal direction; a webbing sensor that operates when the seat belt is rapidly withdrawn at a rate that is larger than a withdrawal rate at normal times, the webbing sensor having a function of stopping the rotation of the spool in the seat belt withdrawal direction; a vehicle sensor function/webbing sensor function cancellation control mechanism that controls cancellation of the function of the vehicle sensor and cancellation of the function of the webbing sensor; and a cancellation-cancelling prevention unit that, when a large load with respect to a load applied at normal times is applied to the vehicle sensor function/webbing sensor function cancellation control mechanism from the vehicle sensor while in a state in which the vehicle sensor function/webbing sensor function cancellation control mechanism has canceled the function of the vehicle sensor, prevents the cancellation of the function of the vehicle sensor from being canceled due to the large load performed by the vehicle sensor function/webbing sensor function cancellation control mechanism.

Furthermore, in a seat belt retractor according to the present invention, while in the state in which the vehicle sensor function/webbing sensor function cancellation control mechanism has canceled the function of the webbing sensor, when the large load is applied to the vehicle sensor function/webbing sensor function cancellation control mechanism from the vehicle sensor, the cancellation-cancelling prevention unit prevents the cancellation of the function of the webbing sensor from being canceled due to the large load performed by the vehicle sensor function/webbing sensor function cancellation control mechanism.

Furthermore, in a seat belt retractor according to the present invention, when, at least, the spool has retracted the total amount of the seat belt, the vehicle sensor function/webbing sensor function cancellation control mechanism controls the vehicle sensor and the webbing sensor such that the function of the vehicle sensor and the function of the webbing sensor are canceled.

Furthermore, in a seat belt retractor according to the present invention, the vehicle sensor function/webbing sensor function cancellation control mechanism includes a vehicle sensor function/webbing sensor function cancellation control member that controls the cancellation of the function of the vehicle sensor and the cancellation of the function of the webbing sensor, and a control cam member that controls an operation of the vehicle sensor function/webbing sensor function cancellation control member by rotating together with the rotation of the spool.

Furthermore, in a seat belt retractor according to the present invention, the vehicle sensor function/webbing sensor function cancellation control member is a control lever that is operated and controlled by the control cam member.

Furthermore, in a seat belt retractor according to the present invention, the control lever includes a first lever that cancels the function of the vehicle sensor, and a second lever that is connected to the first lever so as to be capable of being relatively displaced and that cancels the function of the webbing sensor.

Furthermore, in a seat belt retractor according to the present invention, the cancellation-cancelling prevention unit is constituted by the control cam member.

Furthermore, a seat belt apparatus according to the present invention includes a seat belt that restricts an occupant; a seat belt retractor that retracts the seat belt while allowing the seat belt to be withdrawn, the seat belt retractor operating in an emergency so as to stop withdrawal of the seat belt; a tongue that is slidably supported by the seat belt that has been withdrawn from the seat belt retractor; and a buckle that is provided on the vehicle body or on the vehicle seat, the tongue being locked to the buckle so as to be capable of being engaged and disengaged, in which the seat belt retractor according to any one of the above-described seat belt retractors according to the present invention is used as the seat belt retractor.

Advantageous Effects of Invention

According to the seat belt retractor according to the present invention configured as above, both the function of the vehicle sensor and the function of the webbing sensor can be exerted. Furthermore, the cancellation of the function of the vehicle sensor and the cancellation of the webbing sensor can both be controlled with the vehicle sensor function/webbing sensor function cancellation control mechanism. Accordingly, with a simple configuration employing a single vehicle sensor function/webbing sensor function cancellation control mechanism, the cancellation of the function of the vehicle sensor and the cancellation of the function of the webbing sensor can each be controlled easily.

In particular, when, at least, the spool has retracted the total amount of the seat belt, the function of the vehicle sensor and the function of the webbing sensor are each canceled. Furthermore, by cancelling the function of the vehicle sensor as above, the vehicle sensor can be made inoperable. With the above, it is possible to prevent abnormal sound from occurring from the vehicle sensor of the seat belt retractor that is not used while the vehicle is travelling. Furthermore, by cancellation of the function of the webbing sensor as described above, the webbing sensor can be made inoperable. With the above, when, at least, the spool has stopped after the total amount of the seat belt has been retracted, end lock that occurs by unintentional operation of the webbing sensor can be prevented.

Furthermore, in a state in which the function of the vehicle sensor is canceled, even when an unintentional large load is applied to the vehicle sensor function/webbing sensor function cancellation control mechanism from the vehicle sensor due to some kind of cause, cancellation of the function of the vehicle sensor with the vehicle sensor function/webbing sensor function cancellation control mechanism can be prevented from being canceled with the cancellation-cancelling prevention unit. Accordingly, malfunction of the vehicle sensor function/webbing sensor function cancellation control mechanism caused by the large load can be prevented and the state in which the function of the vehicle sensor is canceled can be maintained.

Furthermore, in a state in which the function of the webbing sensor is canceled, even when the above-described large load is applied to the vehicle sensor function/webbing sensor function cancellation control mechanism from the vehicle sensor due to some kind of cause, cancellation of the function of the webbing sensor with the vehicle sensor function/webbing sensor function cancellation control mechanism can be prevented from being canceled as well with the cancellation-cancelling prevention unit. Accordingly, malfunction of the vehicle sensor function/webbing sensor function cancellation control mechanism caused by the large load can be prevented and the state in which the function of the webbing sensor is canceled can be maintained.

Furthermore, since components that are used in conventional seat belt retractors can be used in the vehicle sensor function/webbing sensor function cancellation control mechanism, the vehicle sensor function/webbing sensor function mechanism can be formed without the need of any large design change and increase in the number of parts can be suppressed. As a result, while enabling control of cancelling the function of the vehicle sensor and cancelling of the function of the webbing sensor, the seat belt retractor can be formed in a compact manner.

As described above, according to the seat belt retractor of the present invention, it would be possible to exert the function of the vehicle sensor and the function of the webbing sensor and to cancel the above functions at a predetermined condition with a simple structure and with a fewer number of parts.

Meanwhile, according to the seat belt apparatus of the present invention, since it is possible to prevent occurrence of an abnormal sound and occurrence of an end lock in the seat belt retractor in a further effective manner, the manipulability of the seat belt is improved, the fastening operation of the seat belt performed by the occupant can be performed in a smooth and stable manner, and the comfort while the vehicle is travelling can be improved.

BRIEF DESCRIPTION OF DRAWINGS

FIG. 4 illustrates the vehicle sensor function/webbing sensor function cancellation control member of the seat belt retractor in which FIG. 4(A) is a perspective view of a first lever, FIG. 4(B) is a perspective view of a second lever, FIG. 4(C) is a perspective view of the assembly, FIG. 4(D) is a front view, FIG. 4(E) is a bottom view, and FIG. 4(F) is a right side view.

DESCRIPTION OF EMBODIMENTS

Hereinafter, an embodiment of the present invention will be described with the drawings.

Figure 1:
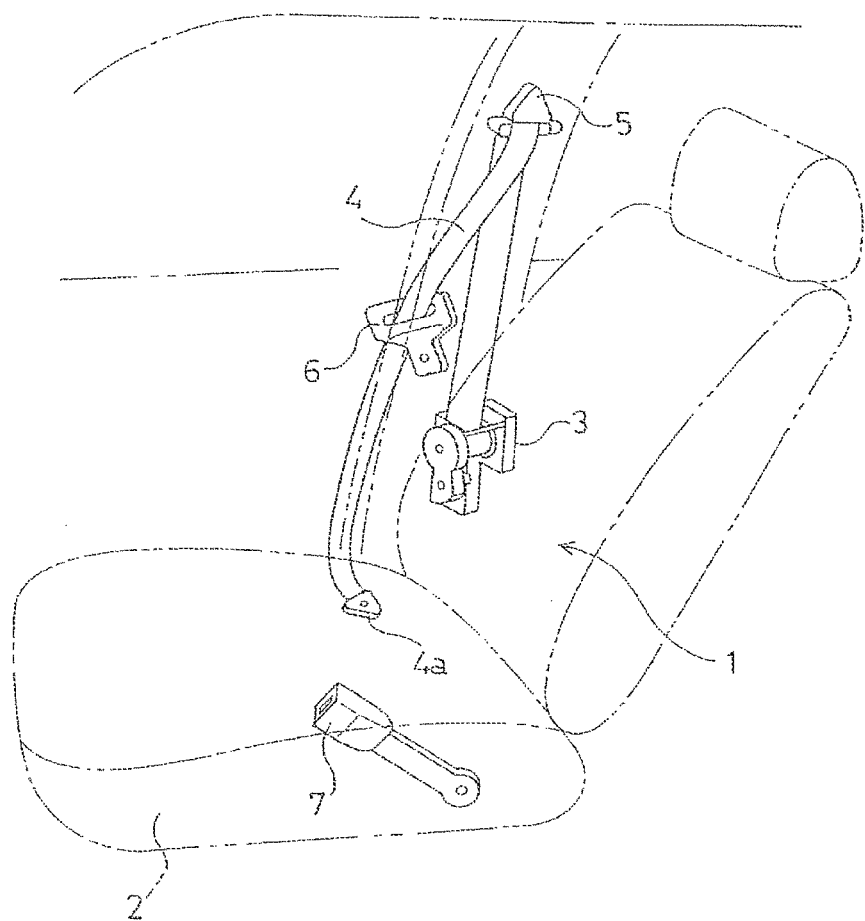
FIG. 1 is a perspective view schematically illustrating a seat belt apparatus provided with an example of an embodiment of a seat belt retractor according to the present invention.

FIG. 1 is a diagram schematically illustrating a seat belt apparatus provided with an example of an embodiment of a seat belt retractor according to the present invention.

As illustrated in FIG. 1, a seat belt apparatus 1 of the example is basically the same as conventionally known three-point seat belt apparatuses. In the drawing, 1 is the seat belt apparatus, 2 is a vehicle seat, 3 is a seat belt retractor disposed in the vicinity of the vehicle seat 2, 4 is a seat belt that is retracted in the seat belt retractor 3 while being allowed to be withdrawn and in which a belt anchor 4a at the distal end thereof is fixed to a floor of the vehicle body or to the vehicle seat 2, 5 is a guide anchor that guides the seat belt 4, which has been withdrawn from the seat belt retractor 3, towards a shoulder of an occupant, 6 is a tongue that is slidably supported by the seat belt 4 that has been guided from the guide anchor 5, and 7 is a buckle that is fixed to the floor of the vehicle or to the vehicle seat and in which the tongue 6 is inserted and engaged so as to be capable of being engaged and disengaged. The fastening operation and the unfastening operation of the seat belt 4 in the seat belt apparatus 1 are also the same as conventionally known seat belt apparatuses.

Figure 2:
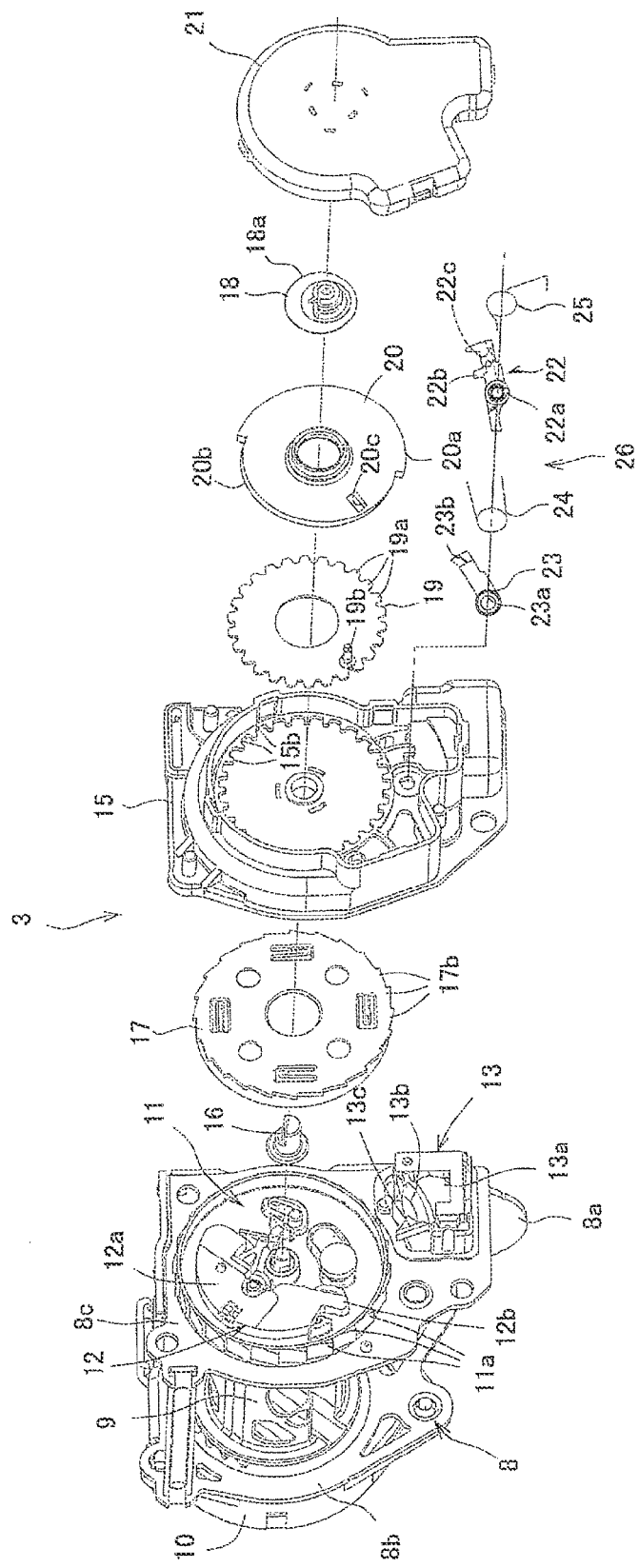
FIG. 2 is an exploded perspective view of the seat belt retractor of the example.
Figure 3:
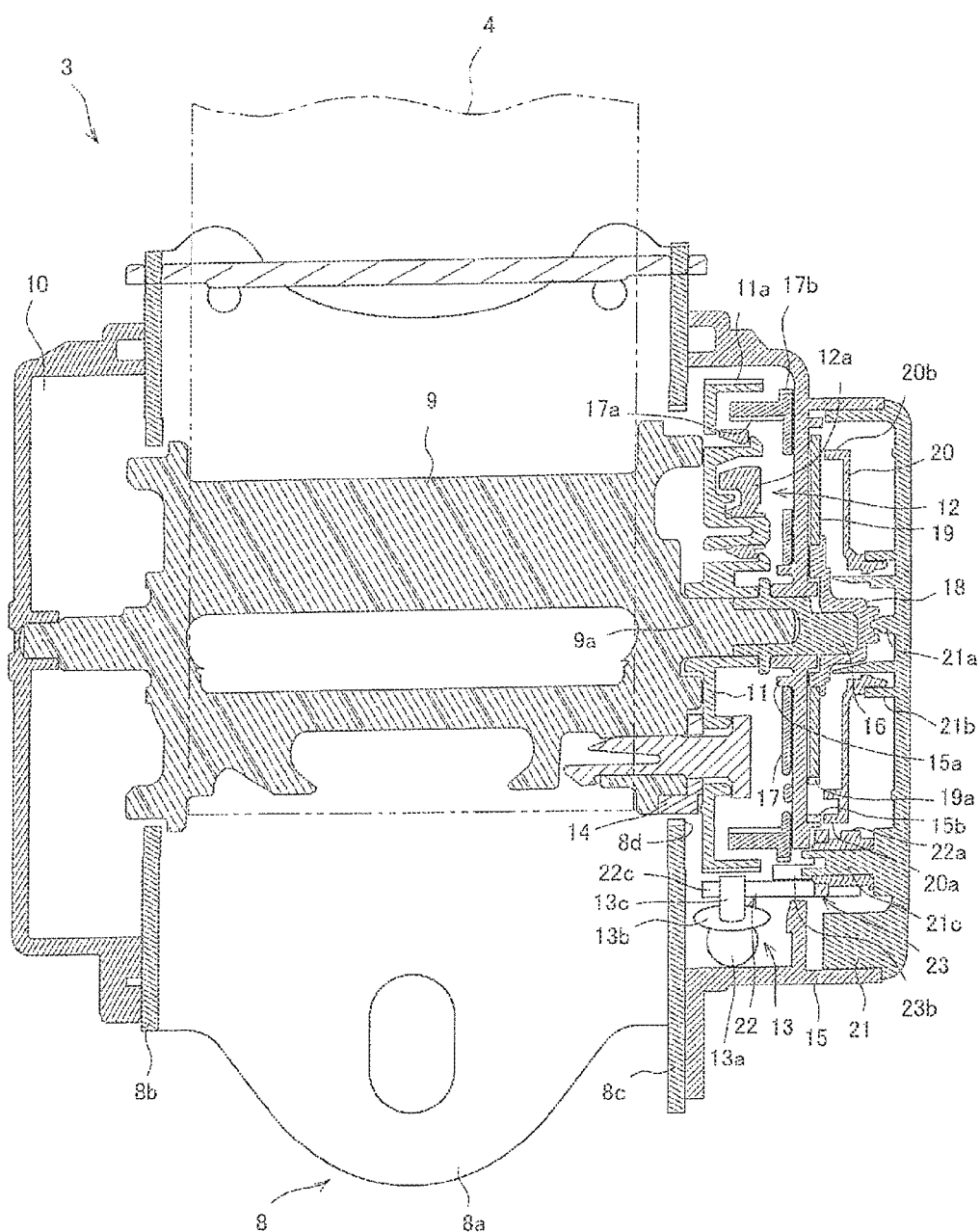
FIG. 3 is a longitudinal section of the seat belt retractor of the example.

FIG. 2 is an exploded perspective view of the seat belt retractor of the example and FIG. 3 is a longitudinal section of the seat belt retractor of the example.

As illustrated in FIGS. 2 and 3, the seat belt retractor 3 according to the example includes, similar to conventionally known typical seat belt retractors, a U-shaped frame 8 including a back plate 8a and left and right side walls 8b and 8c each having a circular opening; a spool 9 that is disposed concentrically or in a substantially concentric manner with respect to the openings of the sidewalls 8b and 8c on both sides of the frame 8 and that is disposed in a rotatable manner so as to retract the seat belt 4; a spring mechanism 10 that constantly biases the spool 9 in a seat belt retraction direction; a lock gear 11 that is fitted to and supported by a rotating shaft 9a of the spool 9 in a concentric manner and that includes a predetermined number of ratchet teeth 11a in the outer periphery thereof, the lock gear 11 integrally rotating with the rotating shaft 9a when the rotation is not stopped and the rotating shaft 9a being relatively rotated when the rotation is stopped; a webbing sensor 12 that includes a flywheel 12a, which is an inertia member supported in the lock gear 11 so as to be capable of being swung, and a lock claw 12b provided in the flywheel 12a; a vehicle sensor 13 (deceleration detection mechanism) that includes an inertia ball 13a that is not operated at normal times and that is operated in an emergency, an actuator 13b that is operated by the operation of the inertia ball 13a, and a lock claw 13c that is operated by the operation of the actuator 13b and that engages with a ratchet tooth 11a of the lock gear 11 so as to stop the rotation of the lock gear 11 in a seat belt withdrawal direction; and a pawl 14 that is pivotally provided in the spool 9 and that stops the spool 9 from rotating in the seat belt withdrawal direction by pivoting so as to engage with an internal tooth 8d of the side wall 8c when the spool 9 relatively rotates in the seat belt withdrawal direction with respect to the lock gear 11. In the above case, a lock mechanism is configured that locks the rotation of the spool 9 in the seat belt withdrawal direction with the internal teeth 8d of the side wall 8c and the pawl 14, and a lock operating and controlling mechanism that operates and controls the lock mechanism is configured with the lock gear 11. The configuration and operation of the above seat belt retractor 3 are the same as those of the seat belt retractor described in, for example, Japanese Unexamined Patent Application Publication No. 2009-61810 and can be easily understood by referring to the above publication before examination; accordingly, detailed description thereof is omitted.

Furthermore, the seat belt retractor 3 of the example includes a retainer 15, a bearing cap 16, a ring gear 17, an eccentric disc 18, an eccentric gear 19, a cam plate 20, a cover 21, a first lever 22, a second lever 23, a first lever biasing spring 24, and a second lever biasing spring 25.

The retainer 15 is attached to the right side wall 8c of the frame 8 in an attachable and detachable manner. The retainer 15 includes a cylindrical support projection 15a and a predetermined number of annular internal teeth 15b. The bearing cap 16 is rotatably fitted in an integral member to an end portion of the rotating shaft 9a of the spool 9 and is rotatably supported by the retainer 15. In other words, the rotating shaft 9a of the spool 9 is rotatably supported by the retainer 15. The ring gear 17 is rotatably supported by the support projection 15a of the retainer 15. The ring gear 17 includes annular internal teeth 17a as well as annular ratchet teeth 17b that are external teeth on the outer peripheral surface thereof. The lock claw 12b of the flywheel 12 can be engaged to the annular internal teeth 17a. Furthermore, engagement of the lock claw 12b to an internal tooth 17a of the ring gear 17, the rotation of which has been stopped, stops the rotation of the lock gear 11.

The eccentric disc 18 is fitted into an end portion of the bearing cap 16 in an integral and rotatable manner and is rotatably supported by a support projection 21a of the cover 21 that is attached to the retainer 15 in an attachable and detachable manner. Accordingly, the eccentric disc 18 is rotatable in an integral manner with the spool 9. The eccentric gear 19 is formed in a disc shape and is fitted and supported to the outer peripheral surface 18a of the eccentric disc 18 in a relatively rotatable manner. In the above case, when the eccentric disc 18 (in other words, the spool 9) rotates, the center of the eccentric gear 19 rotates (eccentrically rotates) while being displaced in the radial direction from the rotation center of the spool 9. The eccentric gear 19 includes external teeth 19a that are provided in an annular manner on the outer peripheral surface thereof. In the above case, some of the external teeth 19a of the eccentric gear 19 mesh with some of the internal teeth 15b of the retainer 15 and the remaining external teeth 19a of the eccentric gear 19 are set apart from the remaining internal teeth 15b of the retainer 15. Furthermore, when the eccentric gear 19 eccentrically rotates upon rotation of the spool 9, the meshing position between the external teeth 19a of the eccentric gear 19 and the internal teeth 15b of the retainer 15 that are meshed to each other sequentially changes; accordingly, the eccentric gear 19 rotates in a direction opposite to the rotation direction of the spool 9 while being decelerated. Furthermore, the eccentric gear 19 includes an integral rotation pin 19b that is provided so as to stand in a direction orthogonal or substantially orthogonal to a flat surface of the eccentric gear 19 (in other words, a direction orthogonal or substantially orthogonal to the axial direction of the spool 9).

The cam plate 20 constitutes a control cam member of the present invention and is fitted to and supported by an inner peripheral surface of a cylindrical support projection 21b of the cover 21 in a rotatable manner. The cam plate 20 includes an outer peripheral surface formed with a cam profile. The cam profile includes, on the outer peripheral surface, a first cam portion 20a that is an arc with a large diameter and a second cam portion 20b that is an arc with a small diameter. The first and second cam portions 20a and 20b are formed of concentric arcs. Furthermore, the cam plate 20 includes a rectangular integral rotation hole 20c that extends in the radial direction. The integral rotation hole 20c is provided in an area corresponding to the second cam portion 20b in the circumferential direction. Furthermore, the integral rotation pin 19b of the eccentric gear 19 is engaged in the integral rotation hole 20c so as to be slidable along the longitudinal direction of the integral rotation hole 20c (in other words, the radial direction of the cam plate 20) and is engaged in the integral rotation hole 20c in the circumferential direction so as to be fitted such that relative displacement is disabled. Accordingly, upon rotation of the eccentric gear 19, the eccentric gear 19 and the cam plate 20 are integrally rotated and the eccentric gear 19 is eccentrically displaced in the radial direction in a relative manner with respect to the cam plate 20.

As illustrated in FIGS. 2, 3, and 4(A), the first lever 22 includes a cylindrical rotary shaft 22a, and the rotary shaft 22a is pivotally supported by a support shaft 21c by being fitted in the support shaft 21c that is provided so as to be erected on the cover 21. The first lever 22 includes a cam follower 22b and a lock claw 22c (details illustrated in FIG. 9) that is provided on the other end portion and on the backside in FIG. 4(A).

The cam follower 22b controls the pivoting of the first lever 22 by abutting against the first and second cam portions 20a and 20b and by being displaced so as to follow the cam surfaces of the first and second cam portions 20a and 20b. (Note that by controlling the rotation of the first lever 22, the rotation of second lever 23 is indirectly controlled.) When the cam follower 22b is abutted against the first cam portion 20a, the lock claw 22c is set apart from the ratchet teeth 17b of the ring gear 17 and is not engaged with a ratchet tooth 17b. With the above, the ring gear 17 becomes freely rotatable. Furthermore, when the cam follower 22b is abutted against the second cam portion 20b, the lock claw 22c is engaged with a ratchet tooth 17b of the ring gear 17 in a direction that stops the rotation of the ring gear 17 in the seat belt withdrawal direction. With the above, the ring gear 17 becomes non-rotatable in the seat belt withdrawal direction.

As illustrated in FIGS. 2 and 4(B), the second lever 23 includes a rotary shaft hole 23a provided on one end portion and an actuator holding portion 23b disposed on the other end portion (an end portion on the opposite side of the rotary shaft 23a). Furthermore, as illustrated in FIG. 4(C) the rotary shaft hole 23a of the second lever 23 is externally fitted to the rotary shaft 22a of the first lever 22 in a pivotal manner. In the above case, the first lever 22 is capable of relatively pivoting at a set relative angle that has been set in advance with respect to the second lever 23 between a cancellation position illustrated by a solid line and a cancellation cancelling position illustrated by a two-dot chain line in FIG. 4(D). In the cancellation position of the first lever 22, the first lever 22 becomes relatively non-pivotal with respect to the second lever 23 in a direction (the anticlockwise direction in FIG. 4(D)) in which the cam follower 22b is separated from the first and second cam portions 20a and 20b. Furthermore, in the cancellation cancelling position of the first lever 22, the first lever 22 becomes relatively non-pivotal with respect to the second lever 23 in a direction (the clockwise direction in FIG. 4(D)) in which the cam follower 22b approaches the first and second cam portions 20a and 20b.

The first lever biasing spring 24 is disposed between the first lever 22 and the cover 21 and constantly biases the first lever 22 in a direction in which the cam follower 22b of the first lever 22 abuts against the first and second cam portions 20a and 20b of the cam plate 20. Furthermore, the second lever biasing spring 25 is disposed between the first lever 22 and the second lever 23 and constantly and relatively biases the first lever 22 towards the cancellation cancelling position illustrated by the two-dot chain line in FIG. 4(D) with respect to the second lever 23. In the above, the biasing force of the second lever biasing spring 25 is set smaller than the biasing force of the first lever biasing spring 24. Moreover, a vehicle sensor function/webbing sensor function cancellation control member 26 that is a control lever of the present invention is constituted by the first and second levers 22 and 23 and the first and second lever biasing springs 24 and 25.

Figure 5:
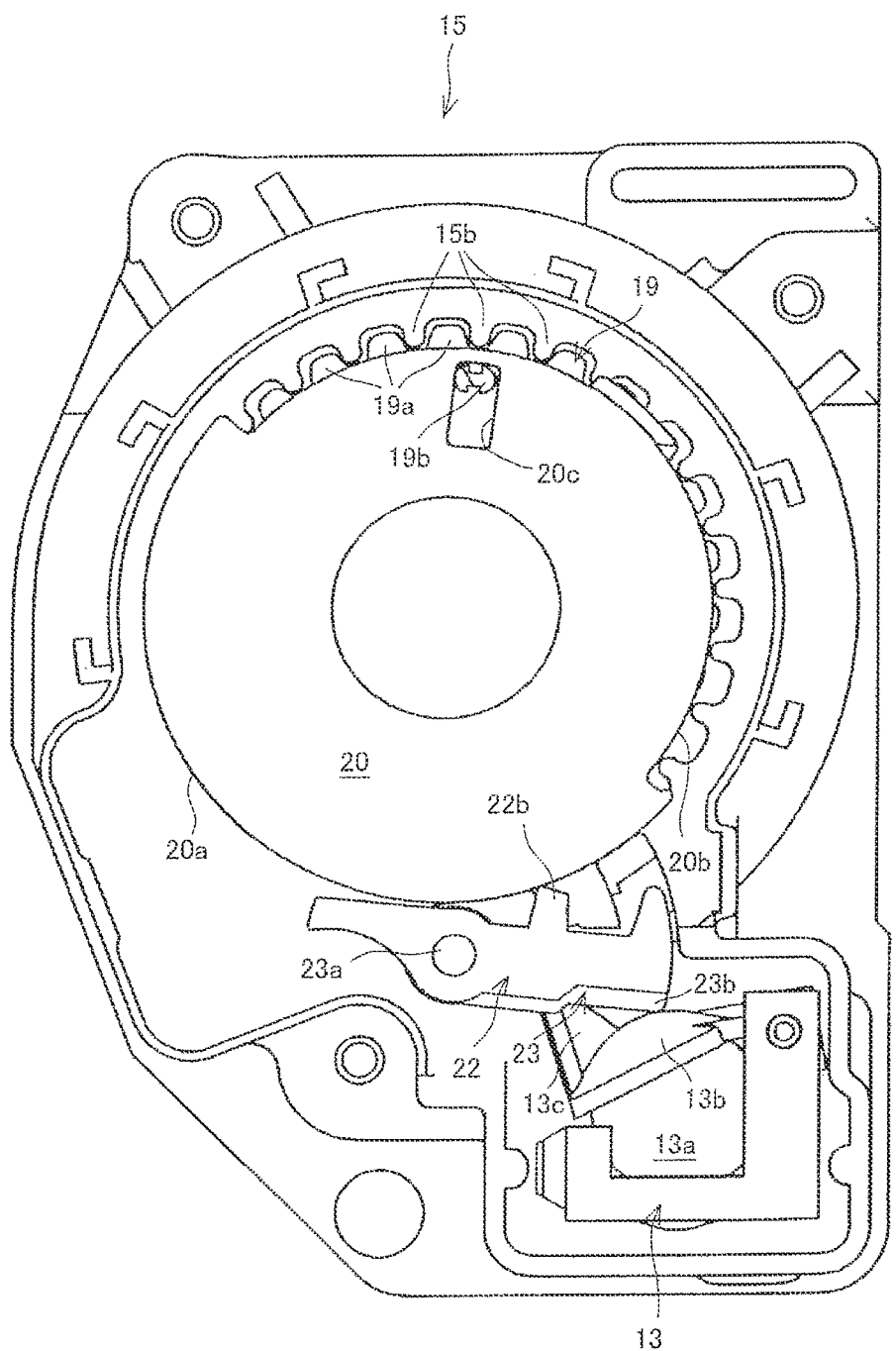
FIG. 5 is a diagram illustrating a state of a cam plate and the first and second levers when the seat belt of the example is fully retracted.
Figure 6:
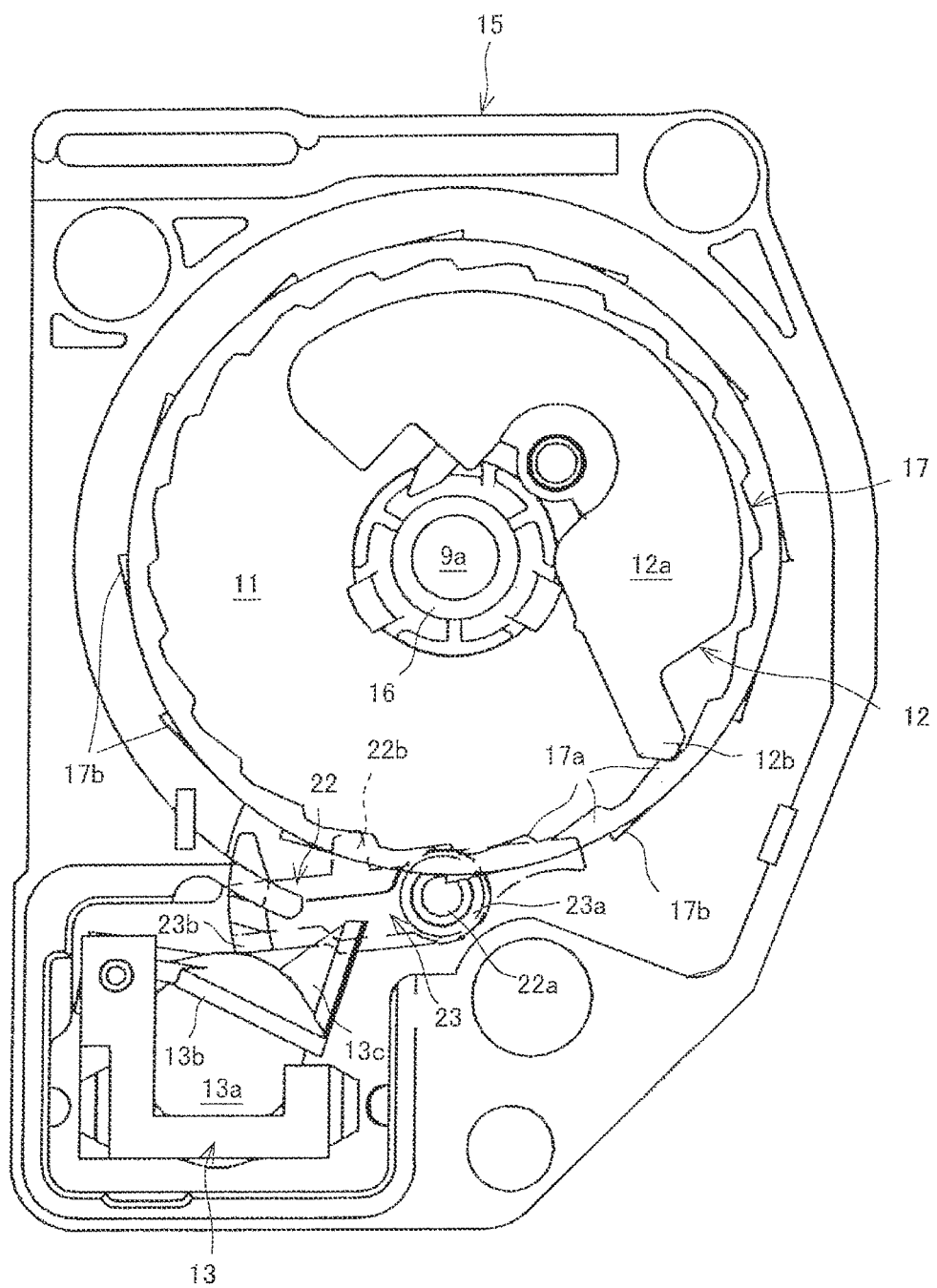
FIG. 6 is a diagram illustrating a state of a ring gear and the first and second levers when the seat belt of the example is fully retracted.

An operation of the seat belt retractor 3 of the example configured as above will be described next. FIG. 5 is a diagram illustrating an inoperable state of the vehicle sensor set by the second lever when the seat belt is fully retracted and FIG. 6 is a diagram illustrating an inoperable state of the webbing sensor set by the first lever when the seat belt is fully retracted.

As illustrated in FIG. 5, in a state in which the seat belt 4 is unfastened and the total amount of the seat belt 4 is retracted in the spool 9 (specifically, a state in which the spool 9 receiving no impediment has retracted the amount of seat belt 4 that can be retracted with the biasing force of the spring mechanism 10), the large diameter first cam portion 20a of the cam plate 20 is oriented downwards and, with the biasing force of the first lever biasing spring 24, the cam follower 22b is abutted against the first cam portion 20a. In the above case, the first lever 22 countering the biasing force of the second lever biasing spring 25 is relatively pivoted with respect to the second lever 23 and is in the cancellation position.

Accordingly, the actuator holding portion 23b of the second lever 23 abuts against the actuator 13b of the vehicle sensor 13 and urges the actuator 13b to a non-operable position; accordingly, the vehicle sensor 13 is set to an inoperable state. As a result, when the vehicle is traveling, the inertia ball 13a of the seat belt retractor 3 of the seat belt apparatus 1, which is not used having no occupant, does not slide and no abnormal noise is generated. Furthermore, the lock claw 13c of the vehicle sensor 13 is maintained at a non-operable position in which the lock claw 13c of the vehicle sensor 13 does not engage with a ratchet tooth 11a of the lock gear 11. Accordingly, the function of the vehicle sensor 13 is canceled.

Furthermore, in a state in which the cam follower 22b abuts against the first cam portion 20a, the lock claw 22c of the first lever 22 is separated from the ratchet teeth 17b of the ring gear 17; accordingly, the ring gear 17 is rotatable in either of the directions, namely, the seat belt withdrawal direction and the seat belt retraction direction. Accordingly, the webbing sensor 12 is in an inoperable state and the function of the webbing sensor 12 is in a canceled state. Note that in FIG. 6, although a state in which the lock claw 12b of the webbing sensor 12 is engaged with an internal tooth 17a of the ring gear 17 is illustrated, the lock claw 12b may be separated from the internal teeth 17a.

Furthermore, in the above case, the eccentric gear 19 is displaced in a substantially obliquely upper right direction in FIG. 5 with respect to the cam plate 20 and is eccentric with respect to the center of the cam plate 20 (in other words, the center of the spool 9). Accordingly, some of the external teeth 19a of the eccentric gear 19 positioned in the obliquely upper right direction mesh with the internal teeth 15b of the retainer 15 and, further, a predetermined number of external teeth 19a of the eccentric gear 19 including the external teeth 19a positioned in the obliquely lower left direction that is not illustrated in FIG. 5 are not meshed with the internal teeth 15b of the retainer 15.

While the seat belt retractor 3 is in the state illustrated in FIGS. 5 and 6, for example, when the occupant withdraws the seat belt 4 at a normal withdrawal rate to fasten the seat belt 4, the spool 9 countering the biasing force of the spring mechanism 10 rotates clockwise in FIG. 6. (Note that although the spool 9 is not illustrated in FIG. 6, the rotation of the above spool 9 upon clockwise rotation of the rotating shaft 9a of the spool 9 can be understood normally in FIG. 6.) Then, since the eccentric disc 18 integrally rotates together with the spool 9 in the same direction, the eccentric gear 19, in an eccentric state, is decelerated and is rotated clockwise that is the direction opposite to the rotation direction of the spool 9 due to meshing between the external teeth 19a and the internal teeth 15b. Since the integral rotation pin 19b of the eccentric gear 19 and the integral rotation hole 20c of the cam plate 20 are engaged with each other in the circumferential direction, the cam plate 20 rotates in a direction that is the same as the rotation direction of the eccentric gear 19.

Figure 7:
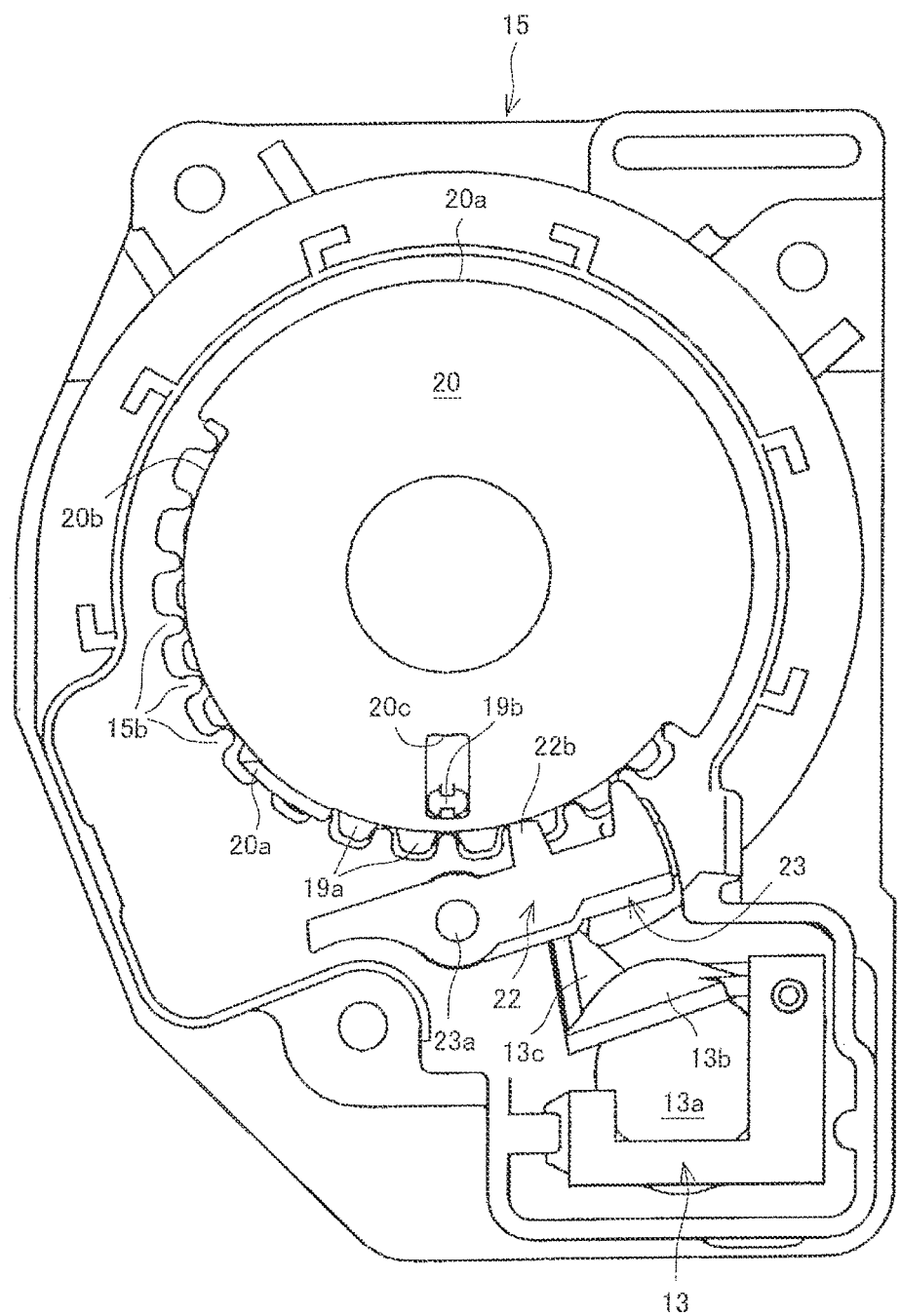
FIG. 7 is a diagram illustrating a state of the cam plate and the first and second levers when the seat belt of the example is withdrawn by a predetermined amount.

When the cam plate 20 rotates by a relatively small predetermined amount, the cam follower 22b escapes from the first cam portion 20a. Then, the first lever 22 pivots anticlockwise in FIG. 5 with the biasing force of the first lever biasing spring 24 and the cam follower 22b abuts against the small diameter second cam portion 20b as illustrated in FIG. 7. In the above case, in the course of pivoting, the first lever 22 relatively pivots with respect to the second lever 23 with the biasing force of the second lever biasing spring 25. Then, when the first lever 22 is at the cancellation cancelling position with respect to the second lever 23, the first lever 22 becomes relatively non-pivotal with respect to the second lever 23 and the second lever 23 also pivots integrally with the first lever 22 in the same direction.

With the pivoting of the second lever 23, the actuator holding portion 23b is separated from the actuator 13b of the vehicle sensor 13. With the above, the actuator 13b of the vehicle sensor 13 becomes operable and the cancellation of the function of the vehicle sensor 13 becomes canceled (is turned off) such that a state in which the function of the vehicle sensor 13 can be exerted is reached.

Accordingly, in the above state, when the vehicle is traveling while the seat belt 4 is fastened around the occupant, similar to conventionally known vehicle sensors, in the vehicle sensor 13, in an emergency, the inertia ball 13a is displaced by inertia and the lock claw 13c engages with a ratchet tooth 11a of the lock gear 11. Then, the seat belt 4 is stopped from being withdrawn and the seat belt 4 becomes capable of restricting the occupant. Furthermore, in the seat belt apparatus 1 provided in the vehicle seat 2 with no occupant, since the seat belt 4 is not withdrawn, the seat belt retractor 3 is in a non-operating state illustrated in FIGS. 5 and 6. Accordingly, the function of the vehicle sensor 13 is in a canceled state and both the inertia ball 13a and the actuator 13b are non-swingable. With the above, abnormal sound generated by sliding of the inertia ball 13a and the actuator 13b while the vehicle is traveling is prevented.

Figure 8:
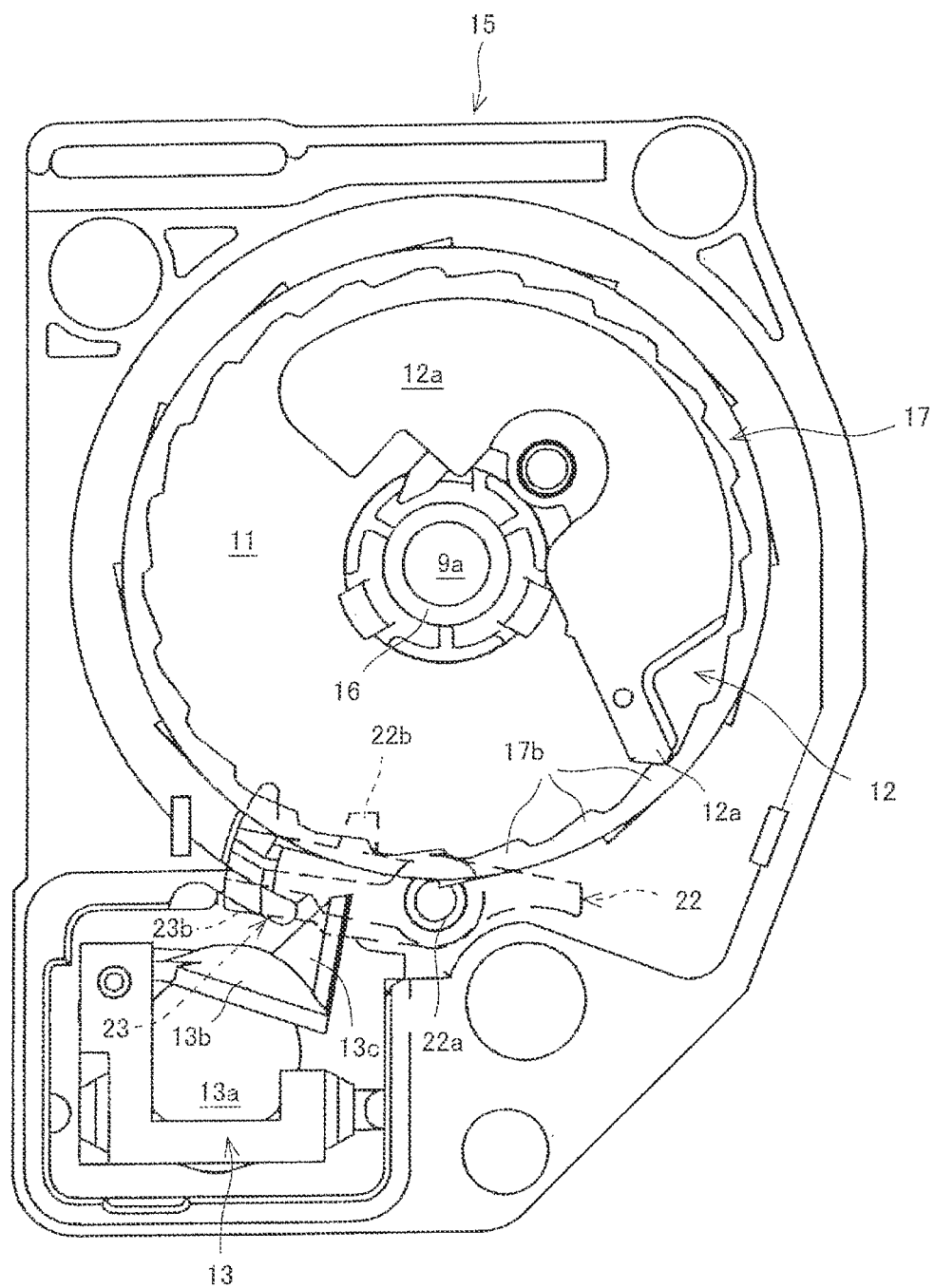
FIG. 8 is a diagram illustrating a state of the ring gear and the first and second levers when the seat belt of the example is withdrawn by a predetermined amount.
Figure 9A:
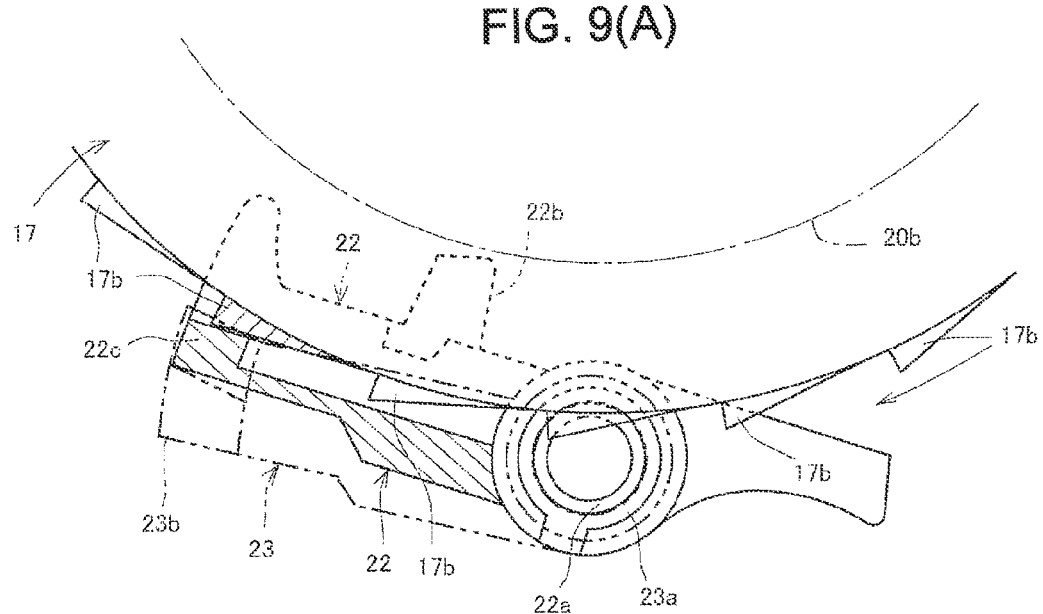
FIG. 9(A) is a diagram for describing the abutting state between a lock claw of the first lever and a tooth tip of a ratchet tooth of the ring gear and FIG. 9(B) is a diagram for describing an engaged state after the abutment between the lock claw of the first lever and the tooth tip of the ratchet tooth of the ring gear has been canceled.
Figure 9B:
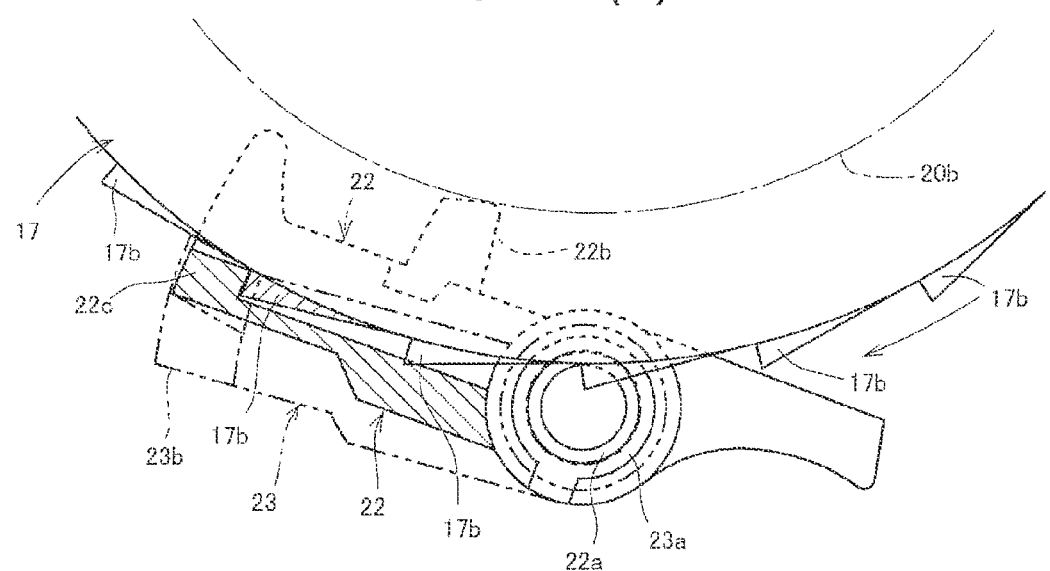

Furthermore, upon pivoting of the first lever 22, as illustrated in FIG. 8, the lock claw 22c engages with the external tooth 17b of the ring gear 17 (illustrated in an enlarged manner in FIG. 9(B)). With the above, the rotation of the ring gear 17 in the seat belt withdrawal direction is stopped and the cancellation of the function of the webbing sensor 12 is canceled (is turned off) such that a state in which the function of the webbing sensor 12 can be exerted is reached. Accordingly, in the above state, similar to conventionally known webbing sensors 12, in the webbing sensor 12, when the seat belt 4 is withdrawn in a seat belt withdrawal rate that is higher and more rapid than the normal seat belt withdrawal rate, the flywheel 12 is swung and the lock claw 12b is engaged with an internal tooth 17b of the ring gear 17. Then, upon withdrawal of the seat belt 4, the ring gear 17 is biased so as to rotate in the seat belt withdrawal direction; however, since the rotation of the ring gear 17 in the seat belt withdrawal direction is stopped, rapid withdrawal of the seat belt 4 is stopped.

Incidentally, when the lock claw 22c approaches the external teeth 17b of the ring gear 17 upon pivoting of the first lever 22, as illustrated in FIG. 9(A), a case in which the lock claw 22c abuts against a tooth tip of an external tooth 17b of the ring gear 17 and impact is applied to the lock claw 22c can be conceived. In the above case, when the lock claw 22c abuts against the tooth tip of the external tooth 17b, the first lever 22 relatively pivots with respect to the second lever 23 in the anticlockwise direction in FIG. 9(A) while contracting the second lever biasing spring 25. With the above, the impact when the lock claw 22c abuts against the tooth tip of the external tooth 17b is absorbed and relieved. Then, when the abutment between the lock claw 22c and the tooth tip of the external tooth 17b is canceled upon pivoting of the ring gear 17, as illustrated in FIG. 9(B), the first lever 22 relatively pivots with respect to the second lever 23 in the clockwise direction in FIG. 9(B) with the biasing force of the second lever biasing spring 25. With the above, the lock claw 22c engages with the external tooth 17b in a normal state and rotation of the ring gear 17 in the seat belt withdrawal direction is stopped.

In order to cancel the fastened seat belt 4, for example, when the seat belt 4 is released from a state illustrated in FIGS. 7 and 8 in which the seat belt 4 is withdrawn by a predetermined amount, the spool 9 rotates in an anticlockwise direction (the seat belt retraction direction) in FIG. 8 with the biasing force of the spring mechanism 10. (Note that although the spool 9 is not illustrated in FIG. 8, in FIG. 8, the rotation of the above spool 9 upon anticlockwise rotation of the rotating shaft 9a of the spool 9 can be understood normally.) With the above, the seat belt 4 is retracted in the spool 9. With the rotation of the spool 9, similar to the above, the cam plate 20 rotates in the anticlockwise direction in FIG. 7, which is a direction opposite to the rotation direction of the spool 9, while being decelerated. In the above case, the cam follower 22b of the first lever 22 abuts against the second cam portion 22b of the cam plate 20, and the first and second levers 22 and 23 are maintained at positions illustrated in FIGS. 7 and 8.

Immediately before the total amount of the seat belt 4 is retracted, a step portion at the boundary between the first cam portion 22a and the second cam portion 22b abuts against the cam follower 22b of the first lever 22. When the spool 9 further rotates in the seat belt retraction direction, the step portion abuts against the cam follower 22b. With the above, with further rotation of the spool 9 in the seat belt retraction direction, the first and second levers 22 and 23 counter the biasing force of the first lever biasing spring 24 and pivot in the clockwise direction in FIG. 7. Furthermore, as illustrated in FIGS. 5 and 6, the actuator holding portion 23b of the second lever 23 abuts against the actuator 13b of the vehicle sensor 13 and urges the actuator 13b to a non-operable position and the pivoting of the second lever 23 stops. However, when the first lever 22 further relatively pivots with respect to the second lever 23 while contracting the second lever biasing spring 25 and when the first lever 22 reaches the cancellation position, the pivoting of the first lever 22 stops and the cam follower 22b abuts against the first cam portion 22a. With the above, the function of the vehicle sensor 13 is canceled.

Furthermore, with the pivoting of the first lever 22, the lock claw 22c of the first lever 22 is separated from the ratchet teeth 17b of the ring gear 17; accordingly, the ring gear 17 becomes capable of pivoting in either of the directions, namely, the seat belt withdrawal direction and the seat belt retraction direction. Accordingly, the function of the webbing sensor 12 is canceled.

When the total amount of the seat belt 4 is retracted in the spool 9, the rotation of the spool 9 stops and retraction of the seat belt 4 by the spool 9 is ended and the seat belt retractor 3 is set to a non-operating state illustrated in FIGS. 5 and 6. In the above case, the function of the webbing sensor 12 and the function of the vehicle sensor 13 are both canceled; accordingly, end lock caused by the webbing sensor 12 and the vehicle sensor 13 that occurs when the seat belt 4 is fully retracted can be prevented.

As described above, in the seat belt retractor 3 of the example, a single vehicle sensor function/webbing sensor function cancellation control member 26 is constituted by the first and second levers 22 and 23. Furthermore, a vehicle sensor function/webbing sensor function mechanism that controls the cancellation of each of the function of the vehicle sensor 13 and the function of the webbing sensor 12 is constituted by the retainer 15, the ring gear 17, the eccentric gear 19, the cam plate 20, and the vehicle sensor function/webbing sensor function cancellation control member 26.

Incidentally, in the seat belt retractor 3 of the example, in a case in which an unintended large load is applied to the actuator holding portion 23b from the actuator 13b of the vehicle sensor 13 due to some kind of cause while the function of the webbing sensor 12 and that of the vehicle sensor 13 are both canceled as above, cancellation of the function of the vehicle sensor 13 being canceled due to malfunction of the vehicle sensor function/webbing sensor function cancellation control member 26 caused due to the load is prevented and, further, cancellation of the function of the webbing sensor 12 is prevented from being canceled as well.

The above prevention of cancellation of the cancellation will be described specifically. As described above, a rotating shaft 22a of the first lever 22 and the rotating shaft 23a of the second lever 23 are fitted so as to be coaxial to each other and the cam follower 22b of the first lever 22 and the actuator holding portion 23*b* of the second lever 23 are disposed on the same side with respect to the two coaxial rotating shafts 22*a* and 23*a*. Furthermore, the cam follower 22*b* of the first lever 22 escaping from the small diameter second cam portion 20*b* and abutting against the large diameter first cam portion 20*a* pivot the first and second levers 22 and 23 in the same direction. In other words, the cam follower 22*b* of the first lever 22 and the actuator holding portion 23*b* of the second lever 23 pivot in the same direction. Furthermore, when the actuator holding portion 23*b* abuts against the actuator 13*b* and urges the actuator 13*b*, pivoting of the second lever 23 stops. With the above, the function of the vehicle sensor 13 is set to a canceled state as described above. Even when the pivoting of the second lever 23 stops, the first lever 22 relatively pivots with respect to the second lever 23 while contracting the second spring 25, and when at the cancellation position, pivoting of the first lever 22 stops. With the above, the function of the webbing sensor 12 is set to a canceled state as described above.

Furthermore, in a state in which the function of the webbing sensor 12 and that of the vehicle sensor 13 are canceled, when an unintended large load is applied to the actuator holding portion 23*b* from the actuator 13*b* of the vehicle sensor 13, since the cam follower 22*b* is abutted against the first cam portion 20*a* and since the first lever 22 is relatively non-pivotal with respect to the second lever 23 in the clockwise direction in FIG. 5, the load is supported by the first cam portion 20*a* through the first and second levers 22 and 23 and the first and second levers 22 and 23 both do not pivot in a direction in which the actuator holding portion 23*b* is separated from the actuator 13*b*. Accordingly, even if an unintended large load is applied to the vehicle sensor function/webbing sensor function cancellation control member 26 from the vehicle sensor 13, the vehicle sensor function/webbing sensor function cancellation control member 26 does not malfunction and the canceled state of each of the functions of the webbing sensor 12 and the vehicle sensor 13 is maintained. As described above, the first cam portion 20*a* constitutes a cancellation-cancelling prevention unit of the present invention.

According to the seat belt retractor 3 of the example, the function of the vehicle sensor 13 and the function of the webbing sensor 12 can both be exerted. Furthermore, the cancellation of the function of the vehicle sensor 13 and the cancellation of the function of the webbing sensor 12 are controlled by the retainer 15, the ring gear 17, the eccentric gear 19, the cam plate 20, and the vehicle sensor function/webbing sensor function cancellation control member 26. Accordingly, with a simple configuration employing a single vehicle sensor function/webbing sensor function cancellation control member 26, the cancellation of the function of the vehicle sensor 13 and the cancellation of the function of the webbing sensor 12 can each be controlled easily.

In particular, when, at least, the spool 9 has retracted the total amount of the seat belt 4, the function of the vehicle sensor 13 and the function of the webbing sensor 12 are each canceled. Furthermore, by cancelling the function of the vehicle sensor 13 as above, the vehicle sensor 13 is made inoperable. With the above, it is possible to prevent abnormal sound from occurring from the vehicle sensor 13 of the seat belt retractor 3 that is not used (in other words, the seat belt retractor 3 of the seat belt apparatus 1 attached to the vehicle seat 2 with no occupant) while the vehicle is travelling. Furthermore, by cancellation of the function of the webbing sensor 12 described above, the webbing sensor 12 is made practically inoperable. With the above, when, at least, the spool 9 has stopped after the total amount of the seat belt 4 has been retracted in the spool 9, end lock that occurs when the webbing sensor 12 is unintentionally operated can be prevented.

Furthermore, in a state in which the function of the vehicle sensor 13 is canceled, even when an unintentional large load is applied to the actuator holding portion 23*b* from the actuator 13*b* of the vehicle sensor 13 due to some kind of cause, the first and second levers 22 and 23 do not pivot in the direction in which the actuator holding portion 23*b* becomes separated from the actuator 13*b*. Accordingly, malfunction of the vehicle sensor function/webbing sensor function cancellation control member 26 caused by the load can be prevented and the state in which the function of the vehicle sensor 13 is canceled can be maintained.

Furthermore, since the retainer 15, the ring gear 17, the eccentric gear 19, and the cam plate 20 that are used in conventional seat belt retractors 3 can be used, the vehicle sensor function/webbing sensor function mechanism can be formed without the need of any large design change and increase in the number of parts can be suppressed. As a result, even while enabling control of cancelling the function of the vehicle sensor 13 and cancelling of the function of the webbing sensor 12, the seat belt retractor 3 can be formed in a compact manner.

As described above, according to the seat belt retractor 3 of the example, the function of the vehicle sensor 13 and the function of the webbing sensor 12 can be exerted and the above functions can be cancelled at a predetermined condition with a simple structure and with a fewer number of parts.

Meanwhile, according to the seat belt apparatus 1 of the example, since it is possible to prevent occurrence of an abnormal sound and occurrence of an end lock in the seat belt retractor 3 in a further effective manner, the manipulability of the seat belt 4 is improved, the fastening operation of the seat belt 4 performed by the occupant can be performed in a smooth and stable manner, and the comfort while the vehicle is travelling can be improved.

Note that the present invention is not limited to the above-described example and various changes in design can be made. For example, in the example described above, the vehicle sensor function/webbing sensor function cancellation control member 26 is constituted by the two first and second levers 22 and 23 that are connected to each other in a relatively pivotal manner; however, the vehicle sensor function/webbing sensor function cancellation control member 26 may be constituted by a single first lever 22. In the above case, the lock claw 22*c* of the second lever 23 is integrally provided in the first lever 22 as a corresponding lock claw. Furthermore, when the lock claw provided in the first lever 22 abuts against the tooth tip of a ratchet tooth 17*b* of the ring gear 17, the first lever biasing spring 24 becomes contracted such that impact is absorbed and relieved. However, since the cam follower 22*b* needs to follow the first and second cam portions 20*a* and 20*b*, the biasing force of the first lever biasing spring 24 needs to be set larger than the biasing force of the second lever biasing spring 25. Accordingly, in order for the impact described above to be absorbed and relieved in a further effective manner, as in the above-described example, it is desirable that the vehicle sensor function/webbing sensor function cancellation control member 26 is constituted by the two first and second levers 22 and 23.

Furthermore, in the above-described example, a single common cam plate 20 that controls the rotation of the first and second levers 22 and 23 has been provided; however, two cam plates that are each provided individually to the corresponding one of the first and second levers 22 and 23 may be provided. In brief, various modifications of the present invention can be made within the scope stipulated in the claims.

INDUSTRIAL APPLICABILITY

The seat belt retractor and the seat belt apparatus of the present invention may be preferably used in a seat belt retractor that at least includes a vehicle sensor that stops withdrawal of the seat belt in an emergency and a wedding sensor that stops the withdrawal of the seat belt when the seat belt is rapidly withdrawn and may be preferably used in a seat belt apparatus employing the seat belt retractor.

REFERENCE SIGNS LIST 1 seat belt apparatus
3 seat belt retractor
4 seat belt
6 tongue
7 buckle
8 frame
9 spool
11 lock gear
12 webbing sensor
12a flywheel
12b lock claw
13 vehicle sensor
13a inertia ball
13b actuator
13c lock claw
15 retainer
15b internal teeth
17 ring gear
17a internal teeth
17b ratchet teeth
18 eccentric disc
19 eccentric gear
19a external teeth
19b integral rotation pin
20 cam plate
20a first cam portion (cancellation-cancelling prevention unit)
20b second cam portion
20c integral rotation hole
22 first lever
22b cam follower
22c lock claw
23 second lever
23b actuator holding portion
24 first lever biasing spring
25 second lever biasing spring
26 vehicle sensor function/webbing sensor function cancellation control member

The invention claimed is:

1. A seat belt retractor including a spool that retracts a seat belt that restricts an occupant, the seat belt retractor comprising:
a vehicle sensor that operates in an emergency in which a deceleration that is larger than a deceleration applied to a vehicle at normal times is applied, the vehicle sensor having a function of stopping rotation of the spool in a seat belt withdrawal direction;
a webbing sensor that operates when the seat belt is rapidly withdrawn at a rate that is larger than a withdrawal rate at normal times, the webbing sensor having a function of stopping the rotation of the spool in the seat belt withdrawal direction;
a vehicle sensor function/webbing sensor function cancellation control mechanism that controls cancellation of the function of the vehicle sensor and cancellation of the function of the webbing sensor; and
a cancellation-cancelling prevention unit that, when a large load with respect to a load applied at normal times is applied to the vehicle sensor function/webbing sensor function cancellation control mechanism from the vehicle sensor while in a state in which the vehicle sensor function/webbing sensor function cancellation control mechanism has canceled the function of the vehicle sensor and the function of the webbing sensor, that controls the cancellation of the function of the vehicle sensor and of the webbing sensor due to the large load performed by the vehicle sensor function/webbing sensor function cancellation control mechanism,
a control cam member that controls an operation of the vehicle sensor function/webbing sensor function cancellation control member by rotating together with the rotation of the spool, and,
wherein the vehicle sensor function/webbing sensor function cancellation control member is a control lever that is operated and controlled by the control cam member, the control lever including a first lever that cancels the function of the vehicle sensor and a second lever that is coaxially connected to the first lever to be movable relative to the first lever and that cancels the function of the webbing sensor.

2. The seat belt retractor according to claim 1, wherein the vehicle sensor function/webbing sensor function cancellation control mechanism controls the vehicle sensor and the webbing sensor so that the function of the vehicle sensor and the function of the webbing sensor are cancelled when the spool at least fully retracts the seat belt.

3. The seat belt retractor according to claim 1, wherein the cancellation-cancelling prevention unit is constituted by the control cam member.

4. The seat belt retractor according to claim 1, wherein, when the function of the vehicle sensor and the function of the webbing sensor are cancelled, an actuator pressing portion of the first lever contacts an actuator of the vehicle sensor, and presses the actuator to a non-operation position.

5. A seat belt apparatus, comprising:
a seat belt that restricts an occupant;
a seat belt retractor that retracts the seat belt while allowing the seat belt to be withdrawn, the seat belt retractor operating in an emergency so as to stop withdrawal of the seat belt;
a tongue that is slidably supported by the seat belt that has been withdrawn from the seat belt retractor; and
a buckle that is provided on the vehicle body or on the vehicle seat, the tongue being locked to the buckle so as to be capable of being engaged and disengaged, wherein
the seat belt retractor according to any one of claims 1, 2, 3, and 4, is used as the seat belt retractor.

* * * * *